United States Patent
DiMatteo et al.

(10) Patent No.: US 6,434,834 B2
(45) Date of Patent: Aug. 20, 2002

(54) LOPPING APPARATUS HAVING STOWABLE BLADES AND ASSOCIATED METHOD

(75) Inventors: Mark W. DiMatteo, Latrobe, PA (US); Thomas C. Oyler, Louisville, KY (US)

(73) Assignee: Gilmour, Inc., Somerset, PA (US)

( * ) Notice: Subject to any disclaimer, the term of this patent is extended or adjusted under 35 U.S.C. 154(b) by 69 days.

(21) Appl. No.: 09/729,594

(22) Filed: Dec. 4, 2000

Related U.S. Application Data

(63) Continuation of application No. 09/292,639, filed on Apr. 15, 1999, now Pat. No. 6,161,291.
(60) Provisional application No. 60/112,461, filed on Dec. 16, 1998.

(51) Int. Cl.$^7$ ............................................... B26B 13/00
(52) U.S. Cl. ........................................... 30/252; 30/192
(58) Field of Search ........................ 30/125, 192, 252, 30/153; 7/128; 81/427.3

(56) References Cited

U.S. PATENT DOCUMENTS

| | | |
|---|---|---|
| 148,566 A | 3/1874 | Kennedy |
| 447,185 A | 2/1891 | Hollweg |
| 476,459 A | 6/1892 | Hamann et al. |
| 573,548 A | 12/1896 | Sours |
| 694,829 A | 3/1902 | Candlish |
| 1,105,191 A | 7/1914 | Flora et al. |
| 1,168,125 A | 1/1916 | Stowell |
| 1,502,191 A | 7/1924 | Helwig |
| 3,230,756 A | 1/1966 | Pearson |
| 3,882,599 A | 5/1975 | Plum |
| 4,547,965 A | 10/1985 | Moore |
| 4,669,140 A | 6/1987 | Miceli |
| D368,634 S | 4/1996 | Frazer |
| 5,809,599 A | 9/1998 | Frazer |
| 5,963,999 A | 10/1999 | Gardiner et al. |

*Primary Examiner*—Douglas D. Watts
(74) *Attorney, Agent, or Firm*—Maginot, Moore & Bowman, LLP

(57) ABSTRACT

A lopping apparatus includes a first handle having a first blade storage compartment. The lopping apparatus further includes a first blade member connected to the first handle, the first blade member having a first cutting portion. The lopping apparatus additionally includes a second handle having a second blade storage compartment. Moreover, the lopping apparatus includes a second blade member connected to the second handle, the second blade member having a second cutting portion. The lopping apparatus additionally includes a first connecting link pivotally coupled to both (i) the first handle at a first pivot location which defines a first pivot axis, and (ii) the second handle at a second pivot location which defines a second pivot axis. The first pivot axis and the second pivot axis define a line L. The lopping apparatus is positionable in a lopping mode of operation and a storage mode of operation. When the lopping apparatus is positioned in the lopping mode of operation, (i) the first cutting portion and the second cutting portion are both positioned on a first side of the line L, and (ii) the first blade storage compartment and the second blade storage compartment are both positioned on a second side of the line L. When the lopping apparatus is positioned in the storage mode of operation, (i) the first cutting portion and the second cutting portion are both positioned on the first side of the line L, (ii) the first blade storage compartment and the second blade storage compartment are both positioned on the first side of the line L, (iii) at least a portion of the first blade member is positioned in either the first blade storage compartment or the second blade storage compartment, and (iv) at least a portion of the second blade member is positioned in either the first blade storage compartment or the second blade storage compartment.

13 Claims, 4 Drawing Sheets

LOPPING APPARATUS HAVING STOWABLE BLADES AND ASSOCIATED METHOD

This application is a continuation of application Ser. No. 09/292,639, filed on Apr. 15, 1999, now U.S. Pat. No. 6,121,291 which in turn claims the benefit of U.S. Provisional Application Ser. No. 60/112,461, filed Dec. 16, 1998.

BACKGROUND OF THE INVENTION

The present invention relates generally to a lopping apparatus, and more particularly to a lopping apparatus which has handle compartments for stowing its blades during periods of non-use.

Numerous lopping devices have heretofore been designed for pruning branches from plants such as trees, shrubs, and bushes. One such lopping device is disclosed in U.S. Pat. No. 3,882,599 issued to Plum. In particular, Plum discloses a device 10 that includes a pair of steel blade 12 which are interconnected by a pivotal connection 14. The device 10 further includes a pair of wooden handles 16 which are respectively attached to the steel blades 12 by an attachment mechanism 16. During operation, the handles 16 are moved relative to each other which, in turn, causes a corresponding movement of the steel blades 12 relative to each other. After the operation is complete, the handles 16 are moved toward each other to their fullest extent thereby causing the blades 12 to close to their fullest extent. The device 10 is then stowed in this closed configuration during periods of non-use typically in a storage area such as a garage or utility shed.

Space is generally at a premium in storage areas such as garages and utility sheds. As a result, it would be desirable to decrease the amount of space occupied by implements and tools such as lopping devices which are stowed away in these storage areas. Moreover, it is desirable to provide an extra degree of safety to implements and tools such as lopping devices while such devices are stowed away in storage areas. It is further desirable to provide a lopping apparatus which is extremely durable.

SUMMARY OF THE INVENTION

According to one embodiment of the present invention, there is provided a lopping apparatus which includes a first handle having a first blade storage compartment. The lopping apparatus further includes a first blade member connected to the first handle, the first blade member having a first cutting portion. The lopping apparatus additionally includes a second handle having a second blade storage compartment. Moreover, the lopping apparatus includes a second blade member connected to the second handle, the second blade member having a second cutting portion. The lopping apparatus additionally includes a first connecting link pivotally coupled to both (i) the first handle at a first pivot location which defines a first pivot axis, and (ii) the second handle at a second pivot location which defines a second pivot axis. The first pivot axis and the second pivot axis define a line L. The lopping apparatus is positionable in a lopping mode of operation and a storage mode of operation. When the lopping apparatus is positioned in the lopping mode of operation, (i) the first cutting portion and the second cutting portion are both positioned on a first side of the line L, and (ii) the first blade storage compartment and the second blade storage compartment are both positioned on a second side of the line L. When the lopping apparatus is positioned in the storage mode of operation, (i) the first cutting portion and the second cutting portion are both positioned on the first side of the line L, (ii) the first blade storage compartment and the second blade storage compartment are both positioned on the first side of the line L, (iii) at least a portion of the first blade member is positioned in either the first blade storage compartment or the second blade storage compartment, and (iv) at least a portion of the second blade member is positioned in either the first blade storage compartment or the second blade storage compartment.

According to another embodiment of the present invention, there is provided a method of operating and stowing a lopping apparatus which includes (i) a first handle having a first blade storage compartment, (ii) a first blade member connected to the first handle, (iii) a second handle having a second blade storage compartment, and (iv) a second blade member connected to the second handle. The method includes the step of operating the lopping apparatus for a first period of time so that the first blade member and the second blade are manipulated to contact a plant in a manner such that a limb of the plant is sheared off. The method further includes the step of manipulating the first handle, the second handle, the first blade member, and the second blade member so that the lopping apparatus is positioned in a storage configuration, wherein when the lopping apparatus is positioned in the storage configuration, (i) at least a portion of the first blade member is positioned in either the first blade storage compartment or the second blade storage compartment, and (ii) at least a portion of the second blade member is positioned in either the first blade storage compartment or the second blade storage compartment. Moreover, the method includes the step of stowing the lopping apparatus for a second period of time while the lopping apparatus is positioned in the storage configuration.

Yet according to another embodiment of the present invention, there is provided a lopping apparatus which includes a first handle having a first blade storage compartment. The lopping apparatus further includes a first blade member connected to the first handle, the first blade member having a first cutting portion. The lopping apparatus also includes a second handle having a second blade storage compartment. Moreover, the lopping apparatus includes a second blade member connected to the second handle, the second blade member having a second cutting portion. The lopping apparatus is positionable in a lopping mode of operation and a storage mode of operation. The first cutting portion and the second cutting portion are each spaced apart from both the first blade storage compartment and the second blade storage compartment when the lopping apparatus is positioned in the lopping mode of operation. When the lopping apparatus is positioned in the storage mode of operation, (i) at least a portion of the first blade member is positioned in either the first blade storage compartment or the second blade storage compartment, and (ii) at least a portion of the second blade member is positioned in either the first blade storage compartment or the second blade storage compartment.

One object of the present invention is to provide a new and useful lopping apparatus.

Another object of the present invention is to provide an improved lopping apparatus.

Still another object of the present invention is to provide a new and useful method of operating and stowing a lopping apparatus.

Yet another object of the present invention is to provide an improved method of operating and stowing a lopping apparatus.

Still another object of the present invention is to provide a lopping apparatus which occupies less space when stowed away in a storage area relative to other lopping apparatus having comparable pruning abilities.

Another object of the present invention is to provide a lopping apparatus having an extra degree of safety while it is stowed away in a storage area.

It is further desirable to provide a lopping apparatus which is extremely durable.

Other objects and benefits of the present invention can be discerned from the following description and accompanying drawings.

DESCRIPTION OF THE PREFERRED EMBODIMENT

Figure 1:
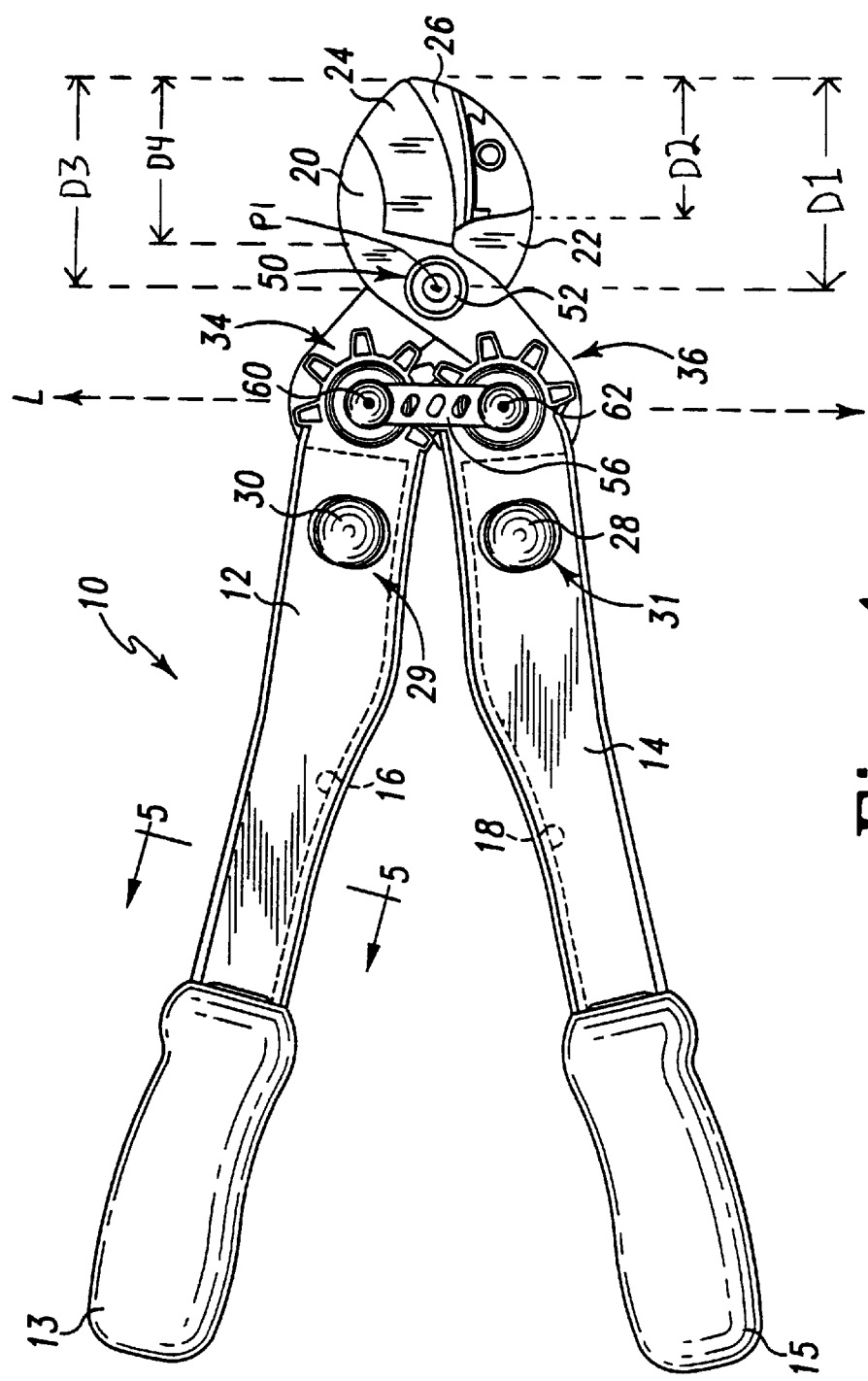
FIG. 1 is a side elevational view of a lopping apparatus which incorporates the features of the present invention therein, with the lopping apparatus being shown in the lopping mode of operation.

While the invention is susceptible to various modifications and alternative forms, a specific embodiment and method thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to the drawings, FIGS. 1–6 show a lopping apparatus 10 which incorporates the features of the present invention therein. The lopping apparatus 10 includes a handle 12 and a handle 14. The handle 12 includes a gripping portion 13, while the handle 14 includes a gripping portion 15. The handle 12 has a blade storage compartment 16 defined therein, while the handle 14 has a blade storage compartment 18 defined therein.

The lopping apparatus 10 further includes a blade member 20 and a blade member 22. The blade member 20 has a cutting portion 24, while the blade member 22 has a cutting portion 26. The cutting portion 24 cooperates with the cutting portion 26 so as to function as an anvil-type cutter as is well known in the art.

Figure 6:
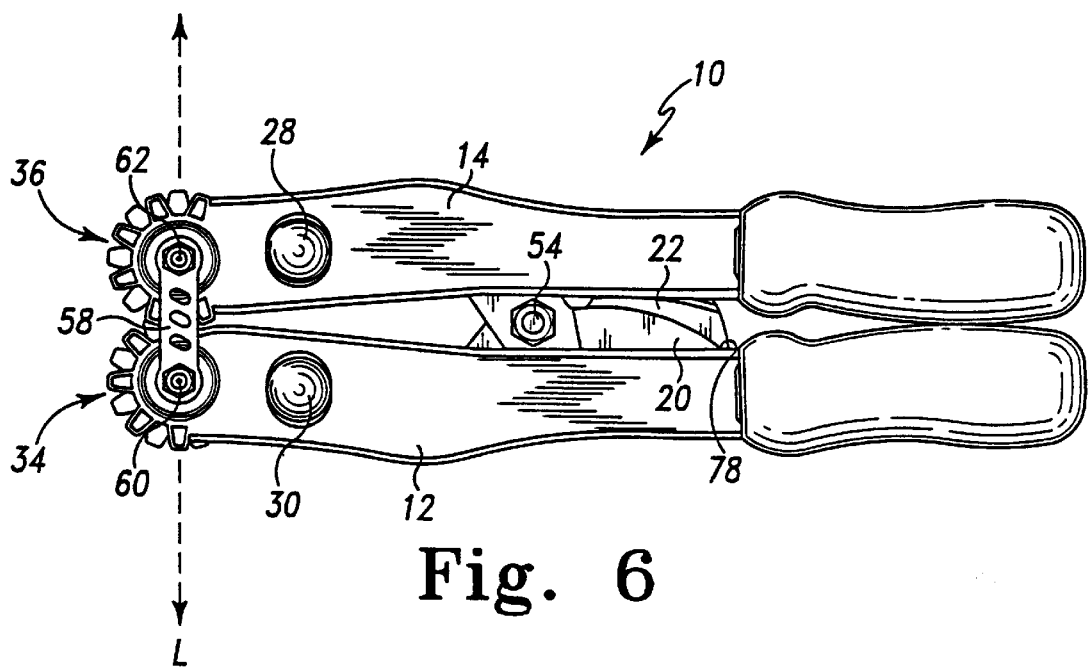
FIG. 6 is a view similar to FIG. 3, but showing the opposite side of the lopping apparatus which is shown in FIG. 3 (i.e. the lopping apparatus of FIG. 6 is shown after it has been rotated 180° relative to its position in FIG. 3).

The blade member 20 is pivotally connected to the handle 14 with a fastener 28 at a handle connection location 29. Similarly, the blade member 22 is pivotally connected to the handle 12 with a fastener 30 at a handle connection location 31. Moreover, the blade member 20 has a fastener aperture which extends therethrough at a blade connection location 50, and also the blade member 22 further has a fastener aperture which extends therethrough at the blade connection location 50 so as to define a pivot axis P1. A bolt 52 extends through both (i) the fastener aperture of blade member 20, and (ii) the fastener aperture of blade member 22. A nut 54 is fastened on the end of the bolt 52 as shown in FIG. 6 so as to ensure that the blade member 20 is pivotally secured to the blade member 22.

A forward portion of the blade member 22 extends from the pivot axis P1 to an extreme forward end of the blade member 22 for a distance D1 as shown in FIG. 1. The cutting surface defined by the cutting portion 26 (as shown in FIG. 1) extends from said extreme forward end of the blade member 22 toward the pivot axis P1 for a distance D2 (see FIG. 1). As also shown in FIG. 1, it should be appreciated that D2/D1>0.5. A forward portion of the second blade member 20 extends from the pivot axis P1 to an extreme forward end of the blade member 20 for a distance D3 as shown in FIG. 1. The cutting surface defined by the cutting portion 24 (as shown in FIG. 1) extends from the extreme forward end of the blade member 20 toward the pivot axis P1 for a distance D4. As also shown in FIG. 1, it should be appreciated that D4/D3>0.5.

The handle 12 further includes a gear portion 34 defined in an end thereof, while the handle 14 includes a gear portion 36 defined in an end thereof. The gear portion 34 meshes with the gear portion 36 during movement of the handle 12 relative to the handle 14. The gear portions 34, 36 facilitate proper positioning of the handle 12 relative to the handle 14 during operation of the lopping apparatus 10. Moreover, providing the lopping apparatus with the gear portions 34, 36 enhances the durability of the lopping apparatus since the gear portions 34, 36 share the mechanical load exerted on the various components of the lopping apparatus 10 during a lopping operation.

Figures 3, 4:
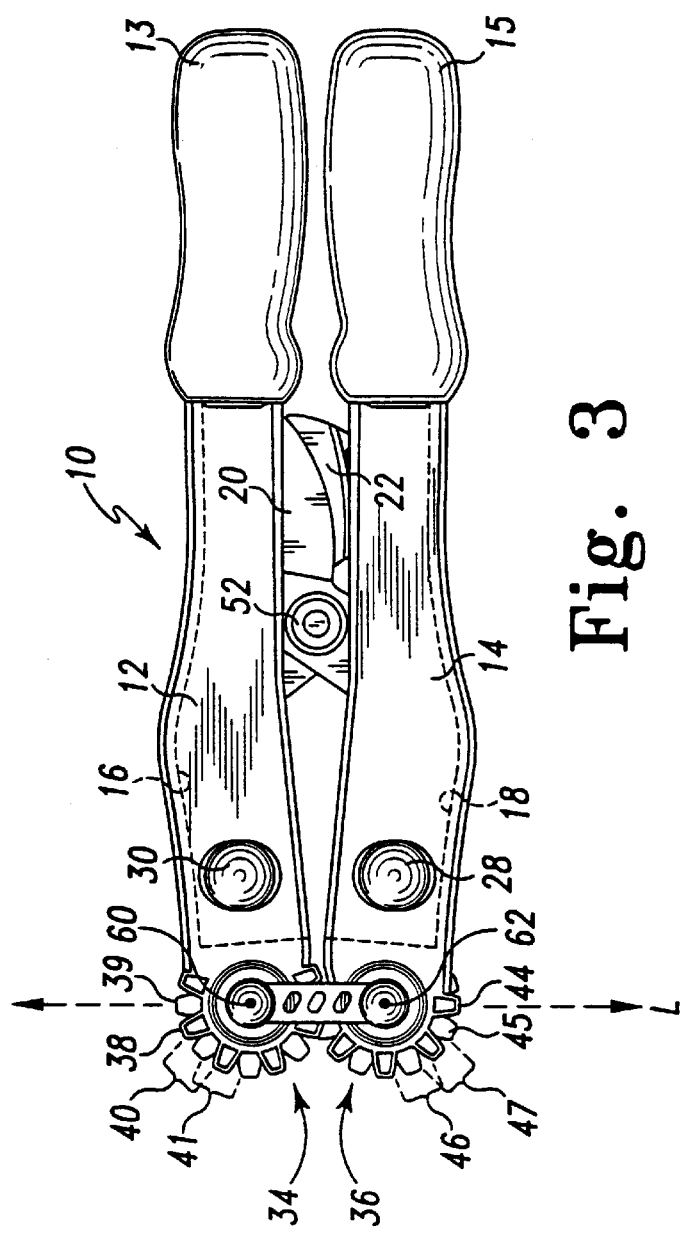
FIG. 3 is a side elevational view of the lopping apparatus of FIG. 1, but showing the lopping apparatus in the storage mode of operation.
FIG. 4 is a bottom elevational view of the lopping apparatus of FIG. 1.

As shown in FIG. 3, the gear portion 34 includes a number of gear teeth 38 and a number of gear teeth 39. The gear teeth 38 define a number of gear slots 40 and the number of gear teeth 39 define a number of gear slots 41. Each gear slot 40 is defined between an adjacent pair of gear teeth 38. Similarly, each gear slot 41 is defined between an adjacent pair of gear teeth 39. Each of the gear teeth 38 is respectively aligned with each of the gear slots 41. Similarly, each of the gear teeth 39 is respectively aligned with each of the gear slots 40. To give meaning to the term "aligned" as it is used in this document, it should be understood that a gear tooth 39 is aligned with a gear slot 40 since the gear tooth 39 is visible through the gear slot 40 in a side elevational such as FIG. 3, as opposed to the gear tooth 39 being hidden behind a gear tooth 38. While significant advantages are achieved by having gear teeth 38, 39 respectively aligned with gear slots 40, 41, many of the advantages of the invention would still be achieved if the gear teeth 38, 39 were not respectively aligned with gear slots 40, 41, but rather the gear teeth 38 were respectively aligned with the gear teeth 39, and the gear slots 40 were respectively aligned with the gear slots 41.

The gear portion 36 includes a number of gear teeth 44 and a number of gear teeth 45. The gear teeth 44 define a number of gear slots 46 and the number of gear teeth 45 define a number of gear slots 47. Each gear slot 46 is defined between an adjacent pair of gear teeth 44. Similarly, each gear slot 47 is defined between an adjacent pair of gear teeth 45. Each of the gear teeth 44 is respectively aligned with each of the gear slots 47. Similarly, each of the gear teeth 45 is respectively aligned with each of the gear slots 46. While significant advantages are achieved by having gear teeth 44, 45 respectively aligned with gear slots 46, 47, many of the advantages of the invention would still be achieved if the gear teeth 44, 45 were not respectively aligned with gear slots 46, 47, but rather the gear teeth 44 were respectively aligned with the gear teeth 45, and the gear slots 46 were respectively aligned with the gear slots 47.

During operation of the lopping apparatus 10, the gear teeth 38 mesh with the gear teeth 44, while the gear teeth 39 mesh with the gear teeth 45. In particular, such meshing occurs when (i) the gear teeth 38 are advanced in and out of the gear slot 46, (ii) the gear teeth 39 are advanced in and out of the gear slot 47, (iii) the gear teeth 44 are advanced in and out of the gear slot 40, and (iv) the gear teeth 45 are advanced in and out of the gear slot 41.

Figure 2:
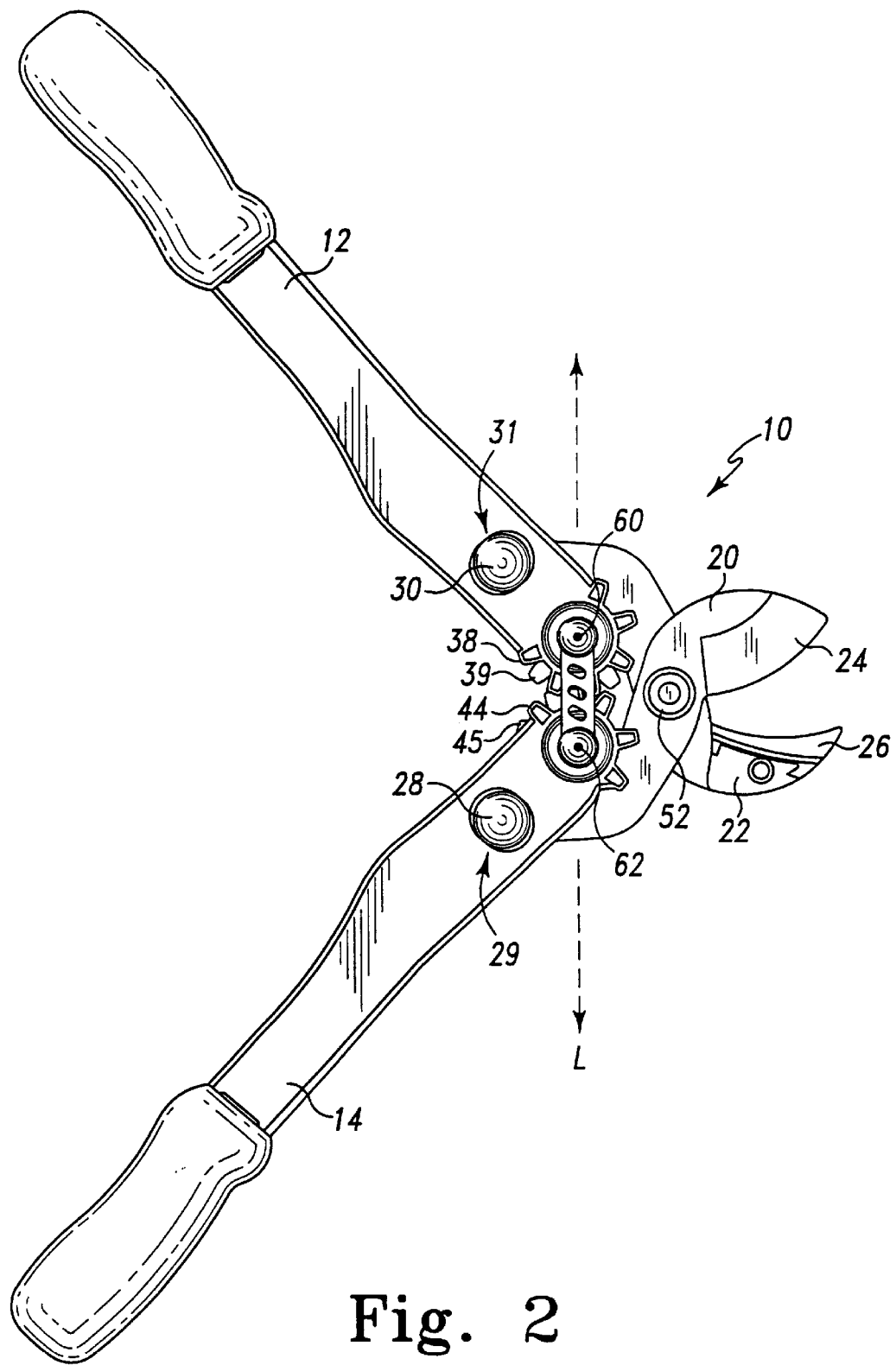
FIG. 2 is a view similar to FIG. 1, but showing the first handle and the second handle each being rotated outwardly relative to its position in FIG. 1.

The lopping apparatus 10 further includes a connecting link 56 and a connecting link 58. One end of the connecting link 56 is pivotally coupled to the handle 12 at a pivot location which defines a pivot axis 60, while the other end of the connecting link 56 is pivotally coupled to the handle 14 at a pivot location which defines a pivot axis 62. The pivot axis 60 and the pivot axis 62 defines a line L. In particular, a line drawn through both the pivot axis 60 and the pivot axis 62 as shown in FIGS. 1 and 2 defines the line L. Moreover, as shown in FIG. 6, one end of the connecting link 58 is also pivotally coupled to the handle 12 at the pivot location which defines the pivot axis 60, while the other end of the connecting link 58 is pivotally coupled to the handle 14 at the pivot location which defines the pivot axis 62.

Figure 5:
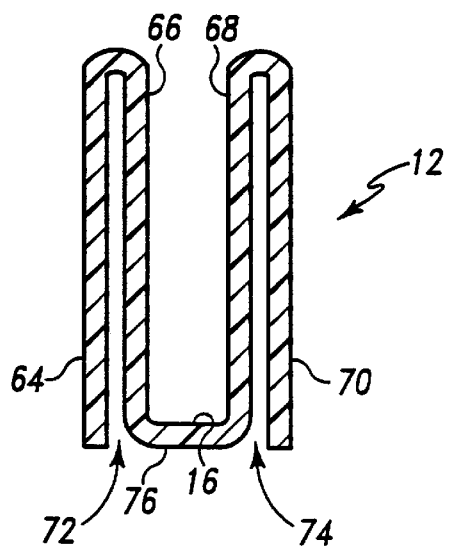
FIG. 5 is a sectional view taken along the line 5—5 of FIG. 1 as viewed in the direction of the arrows, with the gripping portion of the handle removed for clarity of description.

Referring now to FIG. 5, the construction of the handle 12 is shown in greater detail. In particular, the handle 12 includes a left lateral exterior wall 64, a left lateral interior wall 66, a right lateral interior wall 68, and a right lateral exterior wall 70. The left lateral exterior wall 64 is spaced apart from the left lateral interior wall 66 so as to define a left lateral wall gap 72. The right lateral interior wall 68 is spaced apart from the right lateral exterior wall 70 so as to define a right lateral wall gap 74. The handle 12 further includes a back wall 76 secured between the left lateral interior wall 66 and the right lateral interior wall 68. The back wall 76, the left lateral interior wall 66, and the right lateral interior wall 68 collectively define the blade storage compartment 16.

The construction of the handle 14 is substantially similar to the construction of the handle 12 shown in FIG. 5. In particular, the handle 14 includes a left lateral exterior wall, a left lateral interior wall, a right lateral interior wall, and a right lateral exterior wall. The left lateral exterior wall is spaced apart from the left lateral interior wall so as to define a left lateral wall gap. The right lateral exterior wall is spaced apart from the right lateral interior wall so as to define a right lateral wall gap. The handle further includes a back wall secured between the left lateral interior wall and the right lateral interior wall. The back wall, the left lateral interior wall, and the right lateral interior wall collectively define the blade storage compartment 18.

The lopping apparatus 10 is positionable in a lopping mode of operation (see e.g. FIGS. 1 and 2), and a storage mode of operation (see e.g. FIGS. 3 and 6). When the lopping apparatus 10 is positioned in the lopping mode of operation, (i) the cutting portion 24 and the cutting portion 26 are both positioned on a first side of the line L, and (ii) the blade storage compartment 16 and the blade storage compartment 18 are both positioned on a second side of the line L. On the other hand, when the lopping apparatus 10 is positioned in the storage mode of operation, (i) the cutting portion 24 and the cutting portion 26 are both positioned on the first side of the line L, (ii) the blade storage compartment 16 and the blade storage compartment 18 are both positioned on the first side of the line L, (iii) a portion of the blade member 20 is positioned in the blade storage compartment 16, and (iv) a portion of the blade member 22 is positioned in the blade storage compartment 18.

It should be noted that the gripping portion 13 is able to contact the gripping portion 15 when the lopping apparatus 10 is positioned in the storage mode of operation. As shown in FIG. 6, a storage gap 78 is created between the handle 12 and the handle 14 when (i) the gripping portion 13 is in contact with the gripping portion 15, and (ii) the lopping apparatus 10 is positioned in the storage mode of operation. The nut 54 and the bolt 52 are both located in the storage gap 78 when (i) the gripping portion 13 is in contact with the gripping portion 15, and (ii) the lopping apparatus 10 is positioned in the storage mode of operation.

It should be appreciated that the lopping apparatus 10 is operated and stowed in the following manner. During a first period of time, the blade member 20 and the blade 22 are manipulated via handles 12, 14 to contact a plant such as a tree, shrub, or bush in a manner such that a limb of the plant is sheared off. Then, the handles 12, 14, and consequently the blade member 20 and the blade member 22, are manipulated so that the lopping apparatus 10 is positioned in a storage configuration as shown in FIG. 6. Thereafter, the lopping apparatus 10 is stowed away in a storage area such as a garage or utility shed for a second period of time while the lopping apparatus is positioned in the storage configuration. In this way, the lopping apparatus 10 occupies less space and assumes a configuration which provides an added degree of safety while it is stowed in the storage area.

While the invention has been described in detail in the drawings and foregoing description, the same is to be considered as illustrative and not restrictive in character, it being understood that only the preferred embodiments and methods have been shown and described and that all changes and modifications that come within the spirit of the invention are desired to be protected. For example, while the lopping apparatus 10 was described and shown in the drawings as possessing cutting portions 24, 26 which are configured and cooperate with each other as an anvil-type cutter, it should be appreciated that cutting portions 24, 26 may alternatively be configured and cooperate with each other as a bypass-type cutter.

What is claimed is:

1. A lopping apparatus, comprising:
    a first lopping component including (i) a first handle having a first storage compartment, and (ii) a first blade member connected to said first handle, said first blade member having a first cutting surface; and
    a second lopping component including (i) a second handle having a second storage compartment, and (ii) a second blade member connected to said second handle, said second blade member having a second cutting surface;
    wherein said first cutting surface and said second cutting surface are configured to cooperate with each other to prune a plant,
    wherein (i) said first cutting surface is the only workpiece contacting surface supported by said first lopping component, and (ii) said second cutting surface is the only workpiece contacting surface supported by said second lopping component,
    wherein said first cutting surface and said second cutting surface are each spaced apart from both said first blade storage compartment and said second blade storage compartment when said lopping apparatus is positioned in said lopping mode of operation, wherein when said lopping apparatus is positioned in said storage mode of operation, (i) at least a portion of said first blade member is positioned in either said first blade storage compartment or said second blade storage compartment, and (ii) at least a portion of said second blade member is positioned in either said first blade storage compartment or said second blade storage compartment, wherein said first lopping component is configured such that no workpiece contacting surface is positioned in said first storage compartment when said lopping apparatus is positioned in said lopping mode of operation, and wherein said second lopping component is configured such that no workpiece contacting surface is positioned in said second storage compartment when said lopping apparatus is positioned in said lopping mode of operation.

2. The lopping apparatus of claim 1, wherein:

said first lopping component is configured such that no workpiece contacting surface is positioned in said first storage compartment, except for said second cutting surface, when said lopping apparatus is positioned in said lopping mode of operation, and said second lopping component is configured such that no workpiece contacting surface is positioned in said second storage compartment, except for said first cutting surface, when said lopping apparatus is positioned in said lopping mode of operation.

3. The lopping apparatus of claim 2, wherein:

said first blade member and said second blade member are pivotally coupled to each other at a blade connection location so as to define a pivot axis P1, a forward portion of said first blade member extends from said pivot axis P1 to an extreme forward end of said first blade member for a distance D1, said first cutting surface extends from said extreme forward end of said first blade member toward said pivot axis P1 for a distance D2, and $D2/D1>0.5$.

4. The lopping apparatus of claim 3, wherein:

a forward portion of said second blade member extends from pivot axis P1 to an extreme forward end of said second blade member for a distance D3, said second cutting surface extends from said extreme forward end of said second blade member toward said pivot axis P1 for a distance D4, and $D4/D3>0.5$.

5. A lopping apparatus, comprising:

a first lopping component including (i) a first handle having a first storage compartment, and (ii) a first blade member connected to said first handle, said first blade member having a first cutting surface; and a second lopping component including (i) a second handle having a second storage compartment, and (ii) a second blade member connected to said second handle, said second blade member having a second cutting surface;

wherein said first cutting surface and said second cutting surface are configured to cooperate with each other to prune a plant, wherein (i) said first blade member and said second blade member are pivotally coupled to each other at a blade connection location so as to define a pivot axis P1, (ii) a forward portion of said first blade member extends from said pivot axis P1 to an extreme forward end of said first blade member for a distance D1, (iii) said first cutting surface extends from said extreme forward end of said first blade member toward said pivot axis P1 for a distance D2, and (iv) wherein $D2/D1>0.5$, wherein (i) a forward portion of said second blade member extends from pivot axis P1 to an extreme forward end of said second blade member for a distance D3, (ii) said second cutting surface extends from said extreme forward end of said second blade member toward said pivot axis P1 for a distance D4, and (iii) wherein $D4/D3>0.5$, wherein said first cutting surface and said second cutting surface are each spaced apart from both said first blade storage compartment and said second blade storage compartment when said lopping apparatus is positioned in said lopping mode of operation, and wherein when said lopping apparatus is positioned in said storage mode of operation, (i) at least a portion of said first blade member is positioned in either said first blade storage compartment or said second blade storage compartment, and (ii) at least a portion of said second blade member is positioned in either said first blade storage compartment or said second blade storage compartment.

6. The lopping apparatus of claim 5, wherein (i) said first cutting surface is the only workpiece contacting surface supported by said first lopping component, and (ii) said second cutting surface is the only workpiece contacting surface supported by said second lopping component.

7. The lopping apparatus of claim 5, wherein:

no workpiece contacting surface is positioned in said first storage compartment when said lopping apparatus is positioned in said lopping mode of operation, and no workpiece contacting surface is positioned in said second storage compartment when said lopping apparatus is positioned in said lopping mode of operation.

8. The lopping apparatus of claim 7, wherein:

no workpiece contacting surface is positioned in said first storage compartment, except for said second cutting surface, when said lopping apparatus is positioned in said lopping mode of operation, and no workpiece contacting surface is positioned in said second storage compartment, except for said first cutting surface, when said lopping apparatus is positioned in said lopping mode of operation.

9. A method of operating and stowing a lopping apparatus having (i) a first lopping component including a first handle having a first storage compartment, and a first blade member connected to said first handle, said first blade member having a first cutting surface, and (ii) a second lopping component including a second handle having a second storage compartment, and a second blade member connected to said second handle, said second blade member having a second cutting surface, comprising the steps of:

pruning a plant during a first period of time by moving the first cutting surface in relation to the second cutting surface such that a limb of said plant is sheared off;

manipulating said first handle, said second handle, said first blade member, and said second blade member so that said lopping apparatus is positioned in a storage configuration, wherein when said lopping apparatus is positioned in said storage configuration, (i) at least a portion of said first blade member is positioned in either said first blade storage compartment or said second blade storage compartment, and (ii) at least a portion of said second blade member is positioned in either said first blade storage compartment or said second blade storage compartment; and stowing said lopping apparatus for a second period of time while said lopping apparatus is positioned in said storage configuration, wherein (i) said first blade member and said second blade member are pivotally coupled to each other at a blade connection location so as to define a pivot axis P1, (ii) a forward portion of said first blade member extends from said pivot axis P1 to an extreme forward end of said first blade member for a distance D1, (iii) said first cutting surface extends from said extreme forward end of said first blade member toward said pivot axis P1 for a distance D2, and (iv) wherein D2/D1>0.5, and wherein (i) a forward portion of said second blade member extends from pivot axis P1 to an extreme forward end of said second blade member for a distance D3, (ii) said second cutting surface extends from said extreme forward end of said second blade member toward said pivot axis P1 for a distance D4, and (iii) wherein D4/D3>0.5.

10. The method of claim 9, wherein no workpiece contacting surface is positioned in either said first storage compartment or said second storage compartment during said pruning step.

11. The method of claim 10, wherein during said stowing step:

no workpiece contacting surface is positioned in said first storage compartment, except for said second cutting surface, and no workpiece contacting surface is positioned in said second storage compartment, except for said first cutting surface.

12. A method of operating and stowing a lopping apparatus having (i) a first lopping component including a first handle having a first storage compartment, and a first blade member connected to said first handle, said first blade member having a first cutting surface, and (ii) a second lopping component including a second handle having a second storage compartment, and a second blade member connected to said second handle, said second blade member having a second cutting surface, comprising the steps of:

pruning a plant during a first period of time by moving the first cutting surface in relation to the second cutting surface such that a limb of said plant is sheared off;

manipulating said first handle, said second handle, said first blade member, and said second blade member so that said lopping apparatus is positioned in a storage configuration, wherein when said lopping apparatus is positioned in said storage configuration, (i) at least a portion of said first blade member is positioned in either said first blade storage compartment or said second blade storage compartment, and (ii) at least a portion of said second blade member is positioned in either said first blade storage compartment or said second blade storage compartment; and stowing said lopping apparatus for a second period of time while said lopping apparatus is positioned in said storage configuration, wherein during said pruning and stowing steps (i) said first cutting surface is the only workpiece contacting surface supported by said first lopping component, and (ii) said second cutting surface is the only workpiece contacting surface supported by said second lopping component, and wherein no workpiece contacting surface is positioned in either said first storage compartment or said second storage compartment during said pruning step.

13. The method of claim 12, wherein during said stowing step:

no workpiece contacting surface is positioned in said first storage compartment, except for said second cutting surface, and no workpiece contacting surface is positioned in said second storage compartment, except for said first cutting surface.

* * * * *